No. 704,378. Patented July 8, 1902.
J. A. ROBERTSON & C. E. HUTCHINGS.
PHOTOGRAPHIC CAMERA ATTACHMENT.
(Application filed Mar. 13, 1902.)
(No Model.)
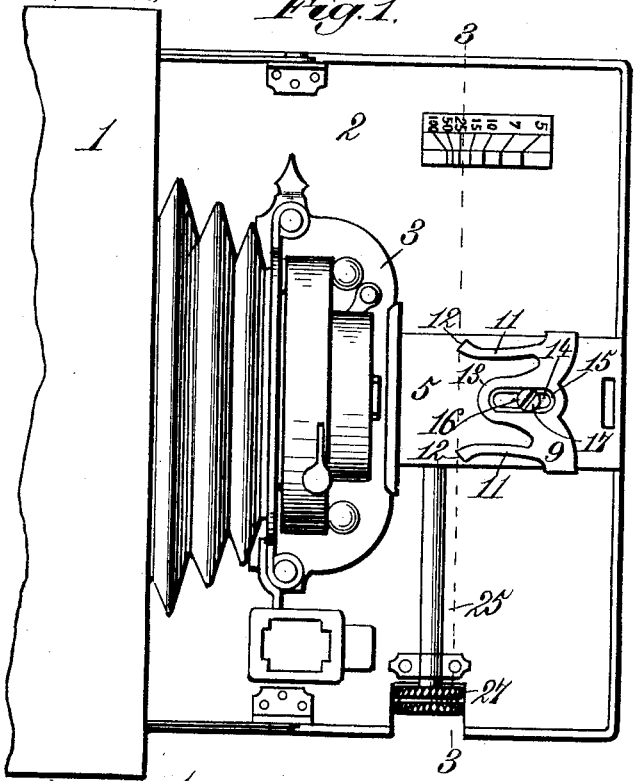
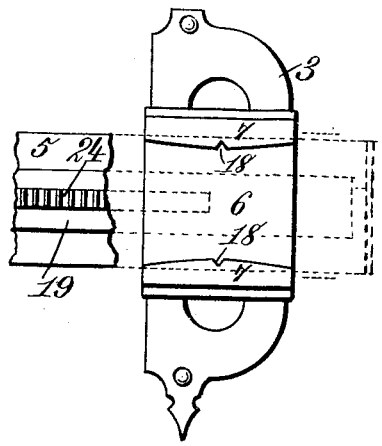
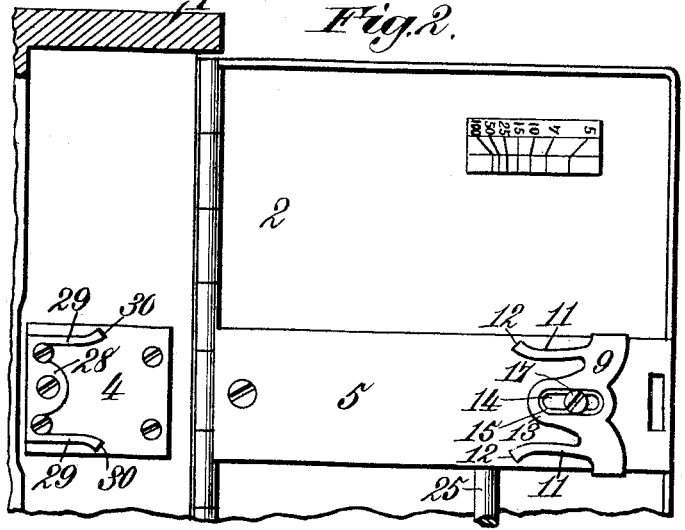
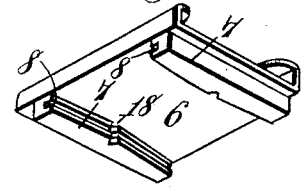
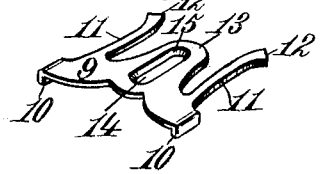
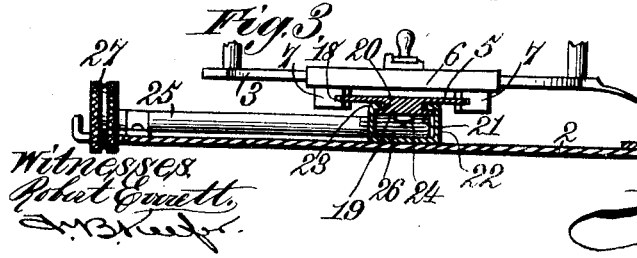
Witnesses
Robert Everett
Inventors
John A. Robertson,
Charles E. Hutchings.
By James L. Norris
Atty.
THE NORRIS PETERS CO., PHOTO-LITHO., WASHINGTON, D. C.

UNITED STATES PATENT OFFICE.

JOHN A. ROBERTSON AND CHARLES E. HUTCHINGS, OF ROCHESTER, NEW YORK, ASSIGNORS TO ROCHESTER OPTICAL AND CAMERA COMPANY, OF ROCHESTER, NEW YORK, A CORPORATION OF NEW YORK.

PHOTOGRAPHIC-CAMERA ATTACHMENT.

SPECIFICATION forming part of Letters Patent No. 704,378, dated July 8, 1902.

Application filed March 13, 1902. Serial No. 98,107. (No model.)

*To all whom it may concern:*

Be it known that we, JOHN A. ROBERTSON and CHARLES E. HUTCHINGS, citizens of the United States, residing at Rochester, in the county of Monroe and State of New York, have invented new and useful Improvements in Photographic-Camera Attachments, of which the following is a specification.

This invention relates to photographic cameras, and especially to an attachment for locking the lens-carriage in place; and it has for its object to provide improved means for automatically locking the lens-carriage in place when the latter is adjusted for photographing distant objects or views.

To this end our invention consists in the features and in the construction, combination, and arrangement of parts hereinafter described, and particularly pointed out in the claims following the description, reference being had to the accompanying drawings, forming a part of this specification, wherein—

Figure 1 is a top plan view of a camera constructed in accordance with our invention, showing the drop-front lowered and the lens-carriage partially drawn out. Fig. 2 is a similar view, a portion being broken away and the camera-casing being in section, the lens-carriage and bellows being removed. Fig. 3 is a sectional view taken on the line 3 3 of Fig. 1. Fig. 4 is a bottom plan view of the lens-carriage and its guideway. Fig. 5 is a detail bottom perspective view of the base of the lens-carriage. Fig. 6 is a detail perspective view of the adjustable locking device.

Cameras have heretofore been provided with means for locking the lens-carriage in place when adjusted for photographing distant views or objects; and it is the purpose of the present invention to provide an improved locking attachment of the character described which will be convenient, simple, and economical in construction and efficient in operation and wherein the locking attachment may be readily adjusted to allow for any variation in the focal lengths of different lenses and which when so adjusted may be easily, quickly, and securely fixed in its adjusted position.

Referring to the drawings, the numeral 1 indicates a camera box or casing, and 2 the hinged or drop front thereof, the same being of well-known and ordinary construction.

The numeral 3 indicates the lens-carriage, which is slidably arranged on a suitable track or guideway 4, attached to the bottom of the camera-casing, and which is also free to be adjusted back and forth upon a guideway 5, consisting of a flat metallic plate, which is suitably attached to the inner or upper side of the drop-front 2 and forms, in effect, an extension of the track or guideway 4. Formed on the under side of the base 6 of the lens-carriage are two longitudinal parallel ribs or flanges, which are provided on their adjacent vertical faces with longitudinal grooves 8, said grooved ribs engaging or straddling the opposite edges of the guideways 4 and 5 and guiding the lens-carriage as the latter is adjusted back and forth.

Disposed on the upper side of the plate 5, forming the guideway, on the drop-front at any suitable point is a catch or locking device comprising a metallic plate 9, provided on its opposite sides with depending flanges 10, which loosely clasp or engage the opposite sides of the plate 5. The plate 9 is provided on one end near its opposite sides or edges with two rearwardly-projecting spring-fingers 11, which are provided at their extremities with laterally-projecting beveled heads 12 for the purpose hereinafter explained. Intermediate said fingers the plate 9 is provided with a rearwardly-projecting tongue 13, which is longitudinally slotted, as at 14, the side walls or edges of said slot being beveled or downwardly inclined, as indicated at 15. Tapped into the plate 6 is a screw 16, which passes through the slot 14, and the head 17 of said screw when tightened up presses against the inclined or beveled edges of the slot 15 and firmly and securely holds the locking attachment in place upon the plate 6.

Formed on the inner or adjacent vertical sides of the ribs or flanges 7 before referred to are two notches or recesses 18, and when the lens-carriage is moved out upon the guideway 5 a certain distance the beveled heads 12 of the spring-fingers 11 will engage said notches or recesses and lock the carriage to the guideway 5.

The plate 5, forming the guideway for the drop-front, is slidably or adjustably secured to the latter in any suitable manner, so that the said guideway can be adjusted back and forth relatively to the camera-casing. In the present instance the plate 5 is shown as being provided on its under side with a narrower plate 19, provided on its opposite edges with grooves or ribs 20, forming laterally-projecting flanges 21, and rigidly attached to the upper inner side of the drop-front 2 is a plate having upwardly-turned sides or flanges 22, which are provided at their upper ends with inwardly-turned flanges 23, which project into the grooves 20 of the plate 19, thus forming a track upon which the guideway 5 is adapted to freely move. Attached to the under side of the plate 19 is a longitudinal rack 24, and journaled in suitable bearings attached to the upper or inner side of the drop-front 2 is a transverse shaft 25, provided at its inner end with a pinion 26, which engages said rack, and said shaft is provided at its outer end with a milled knob 27, by means of which the said rod may be readily turned to rotate it and through the medium of the pinion and rack adjust the guideway back and forth toward and from the camera-casing.

In practice it is found that there exists a considerable variation in the focal lengths of lenses that are intended to be fitted to cameras of the same size, and by means of the present invention the lens-carriage may be adjusted to a proper position for photographing distant objects or views—say, for example, wherein the view is distant a hundred feet or more—and the locking attachment may then be set so that its beveled heads will engage the notches 18, formed in the ribs 7 on the under side of the base of the lens-carriage. After this has been done the screw 16 is tightened up, firmly securing the locking attachment to the plate 5. Thereafter the lens-carriage may be readily moved out at any time until the beveled heads of the spring-fingers engage the notches and hold the lens at the proper point to place the camera in focus for accurately photographing the distant view. When it is desired to focus the lens for the purpose of taking a nearer view, the guideway 5 may be adjusted by means of the rack-and-pinion arrangement before described, thus moving the lens-carriage to the proper point to bring the camera in exact focus.

After the camera-bellows has been folded up and the lens-carriage moved back into the camera box or casing preparatory to folding up or closing the drop-front it is desirable to lock the lens-carriage in its retracted position, so that it will not interfere with the closing movement of the drop-front and so that the lens will be held out of contact with said drop-front, and for this purpose the following means are provided: To the upper side of the rear or inner end of the plate forming the fixed guideway 4 is a locking device comprising a plate 28, screwed or otherwise immovably attached to said guideway and provided at its forward end with two forwardly-projecting horizontal and parallel spring-fingers 29, having laterally-projecting beveled heads 30 formed on the outer sides of their ends. When the lens-carriage is pushed back within the camera-casing, said spring-fingers pass between and are compressed by the ribs or flanges 7 on the under side of the base 6 of the lens-carriage, and when the notches 18, before referred to, in said ribs or flanges arrive opposite said beveled heads the latter spring outward and enter said notches, thus locking the lens-carriage in its retracted position.

Having described our invention, what we claim is—

1. In a camera, the combination with a guideway, of a lens-carriage adjustable thereon, a locking device adjustably arranged on the guideway and constructed and arranged to engage the lens-carriage and automatically lock the latter at a predetermined point when the lens-carriage is drawn out, substantially as described.

2. In a camera, the combination with a guideway, of a lens-carriage adjustable thereon, a locking device movably arranged on said guideway toward and from the carriage, means for locking said locking device on the guideway, and means carried by the lens-carriage and arranged to be automatically engaged by said locking device to lock the lens-carriage at a predetermined point when drawn out, substantially as described.

3. In a camera, the combination with a guideway, of a lens-carriage movably arranged on said guideway, a locking device carried by said guideway and arranged to automatically engage the lens-carriage and lock the latter at a predetermined point when drawn out, and means for adjusting said guideway backward and forward, substantially as described.

4. In a camera, the combination with a guideway, of a lens-carriage movably arranged thereon, of a locking device comprising a plate adjustably mounted on said guideway and provided with spring-fingers adapted to engage and interlock with the lens-carriage, substantially as described.

5. In a camera, the combination with a guideway and a lens-carriage movably arranged thereon, a locking device comprising a plate having depending flanges which engage the opposite sides of said guideway and having spring-fingers constructed and arranged to engage the lens-carriage and lock the latter in place, substantially as described.

6. In a camera, the combination with a guideway and a lens-carriage movably arranged thereon, of a locking device comprising a plate provided at its opposite sides with depending flanges arranged to engage the opposite sides of said guideway and having a centrally-slotted portion, a set-screw passing through said slotted portion and holding said plate in place, the said plate being provided with spring-fingers having beveled heads adapted to engage corresponding recesses in the lens-carriage, substantially as described.

7. In a camera, the combination with a guideway, of a lens-carriage movably arranged thereon, a locking device on the guideway and comprising a plate secured to the guideway and having two horizontal spring-fingers provided on the outer sides of their ends with laterally-projecting beveled heads, and two ribs on the lens-carriage arranged to straddle and compress said spring-fingers and provided on their adjacent faces with notches adapted to be engaged by said beveled heads, substantially as described.

In testimony whereof we have hereunto set our hands in presence of two subscribing witnesses.

JOHN A. ROBERTSON.
CHAS. E. HUTCHINGS.

Witnesses:
MINNA STULL,
GEO. W. REILLY.